(12) United States Patent
Chen et al.

(10) Patent No.: US 9,030,104 B2
(45) Date of Patent: May 12, 2015

(54) METHOD AND SYSTEM FOR ADJUSTING POWER SUPPLY AND DISPLAY SCREEN BRIGHTNESS OF ELECTRONIC DEVICE WITH THIN-FILM SOLAR PANEL

(75) Inventors: Charn-Ying Chen, Taoyuan (TW); Chi-Yuan Chang, Taichung (TW); Cheng-Si Tsao, Longtan Township, Taoyuan County (TW); Chih-Min Chuang, Longtan Township, Taoyuan County (TW); Hou-Chin Cha, Longtan Township, Taoyuan County (TW); Yu-Ching Huang, New Taipei (TW); Yeong-Der Lin, Longtan Township, Taoyuan County (TW); Fan-Hsuan Hsu, Longtan Township, Taoyuan County (TW); Chia-Hsin Lee, Longtan Township, Taoyuan County (TW)

(73) Assignee: Institute of Nuclear Energy Research, Atomic Energy Council, Executive Yuan (TW)

( * ) Notice: Subject to any disclaimer, the term of this patent is extended or adjusted under 35 U.S.C. 154(b) by 523 days.

(21) Appl. No.: 13/469,569

(22) Filed: May 11, 2012

(65) Prior Publication Data
US 2013/0234606 A1 Sep. 12, 2013

(30) Foreign Application Priority Data
Mar. 6, 2012 (TW) .............................. 101107494 A

(51) Int. Cl.
*H05B 37/02* (2006.01)
*H05B 39/04* (2006.01)
*H05B 41/36* (2006.01)
*G09G 3/34* (2006.01)
*H02J 7/35* (2006.01)

(52) U.S. Cl.
CPC .......... *G09G 3/3406* (2013.01); *H05B 37/0218* (2013.01); *Y02B 20/46* (2013.01); *G09G 2320/0626* (2013.01); *G09G 2330/021* (2013.01); *G09G 2360/144* (2013.01); *H02J 7/35* (2013.01)

(58) Field of Classification Search
USPC .................................................. 315/149–176
See application file for complete search history.

(56) References Cited

U.S. PATENT DOCUMENTS

| | | | |
|---|---|---|---|
| 7,046,220 B2 * | 5/2006 | Tagawa et al. | 345/76 |
| 7,978,187 B2 * | 7/2011 | Nathan et al. | 345/204 |
| 2003/0020413 A1 * | 1/2003 | Oomura | 315/169.3 |
| 2004/0257355 A1 * | 12/2004 | Naugler | 345/204 |
| 2007/0080908 A1 * | 4/2007 | Nathan et al. | 345/77 |

* cited by examiner

*Primary Examiner* — Brandon S Cole
(74) *Attorney, Agent, or Firm* — Schmeiser, Olsen & Watts, LLP

(57) ABSTRACT

A method and system for adjusting power supply and display screen brightness of an electronic device with a thin-film solar panel are introduced. The method includes configuring the electronic device with a first threshold level and a second threshold level, wherein the first threshold level and the second threshold level are voltage levels or current levels; attaching the thin-film solar panel to a casing of the electronic device for enabling the electronic device to convert an external light into a transformed voltage or current; and determining whether the transformed voltage or current lies between the first threshold level and the second threshold level to decide whether to allow the display screen to operate at an existing brightness level thereof continuously. The method and system enable the electronic device to receive the external light for supplementing power supple and sense the external light for adjusting power level.

11 Claims, 5 Drawing Sheets

METHOD AND SYSTEM FOR ADJUSTING POWER SUPPLY AND DISPLAY SCREEN BRIGHTNESS OF ELECTRONIC DEVICE WITH THIN-FILM SOLAR PANEL

CROSS-REFERENCE TO RELATED APPLICATION

This non-provisional application claims priority under 35 U.S.C. §119(a) on Patent Application No(s). 101107494 filed in Taiwan, R.O.C. on Mar. 6, 2012, the entire contents of which are hereby incorporated by reference.

FIELD OF THE INVENTION

The present invention relates to methods and systems for rendering electronic devices energy-efficient, and more particularly, to a method and system for adjusting power supply and display screen brightness of an electronic device with a thin-film solar panel capable of supplying power, charging, and detection.

BACKGROUND OF THE INVENTION

In recent years, changes in lifestyle leads to wide use of electronic devices, such as notebook computers, tablet computers, smartphones, e-books, personal digital assistants (PDA), and multimedia players.

The aforesaid electronic devices are powered by batteries. Hence, what is important to the aforesaid electronic devices is the data related to battery power level and battery sustainability.

According to the prior art, engineers enable an electronic device to operate for a longer period of time before its battery runs out of power, by taking the following measures: increasing the battery capacity, making the electronic device more power-saving, or providing an additional auxiliary power source to the electronic device.

Electronic devices can be rendered power-saving through power management. The most power-consuming component of a display-enabled electronic device is a display screen. Take a liquid crystal display screen as an example, the liquid crystal display screen comprises liquid crystal cells and a backlight unit. The backlight unit generates light for lighting up the liquid crystal cells in operation. If the liquid crystal cells in operation are not lit up, users cannot read what is displayed on the liquid crystal cells. In general, the backlight unit is the most power-consuming components of a display-enabled electronic device.

Known ways of power management of a display-enabled electronic device are of two categories, namely hardware-based power management and software-based power management. The hardware-based power management involves detecting ambient light with a light sensor (such as a photo-resistor), increasing the light intensity of the light generated from the backlight unit when strong light intensity of ambient light is detected to allow the user to read an image displayed on the liquid crystal cells, and decreasing the light intensity of the light generated from the backlight unit when weak light intensity of ambient light is detected to save power.

Furthermore, take a smartphone as an example, the speaker is equipped with a light sensor whereby the backlight unit is shut down as soon as the user starts a conversation on the smartphone. The software-based power management involves detecting the use status of the electronic device and instructing the electronic device to enter a standby mode, a hibernation mode, or a shutdown mode upon detection that the electronic device is idle.

However, the aforesaid prior art has its own drawbacks. First, the additional hardware (such as a light sensor) also consumes power to the detriment of power saving. Second, although the software-based power management saves power by determining the point in time to start or shut down the backlight unit, it does not offer a power-saving solution to the backlight unit in operation.

SUMMARY OF THE INVENTION

It is an objective of the present invention to provide a method for adjusting power supply and display screen brightness of an electronic device with a thin-film solar panel. The method enables the electronic device to adjust the display screen brightness thereof automatically in accordance with an external light so as to effectuate power saving.

Another objective of the present invention is to provide a system for adjusting power supply and display screen brightness of an electronic device with a thin-film solar panel. Given the system, an electronic device with a display screen is rendered energy-efficient.

In order to achieve the above and other objectives, the present invention provides a method for adjusting power supply and display screen brightness of an electronic device with a thin-film solar panel. The method is applicable to an electronic device having a display screen and a casing. The method comprises the steps of: configuring the electronic device with a first threshold level and a second threshold level, the first threshold level being higher than the second threshold level, wherein the first threshold level and the second threshold level are at least one of a voltage level and a current level; attaching the thin-film solar panel to the casing for enabling the electronic device to convert an external light into a transformed voltage or current; and determining whether the transformed voltage or current lies between the first threshold level and the second threshold level to determine whether to supply the transformed voltage or current to the electronic device continuously so as to maintain a brightness of the display screen.

In order to achieve the above and other objectives, the present invention provides a system for adjusting power supply and display screen brightness of an electronic device with a thin-film solar panel. The system is applicable to an electronic device having a display screen. The system comprises a casing, a thin-film layer, and a control unit. The casing holds the display screen. The thin-film layer is disposed at at least a portion of the casing and adapted to receive an external light for performing photoelectrical conversion to generate the transformed voltage or current. The control unit is configured with a first threshold level and a second threshold level, connected to the thin-film layer, and adapted to control a brightness of the display screen in accordance with a result of comparison of the transformed voltage or current with the first threshold level and the second threshold level, wherein the first threshold level and the second threshold level is in form of at least one of a voltage and a current.

Compared with the prior art, the present invention provides a method and system for adjusting power supply and display screen brightness of an electronic device with a thin-film solar panel. The method and system of the present invention are effective in supplying power, charging, and detection by means of a single thin-film solar panel (also defined as a solar energy thin-film layer according to the present invention) disposed at a casing of the electronic device, and thus power management can be efficiently performed on the electronic device. The solar energy thin-film layer receives an external light (such as sunlight, indoor light, or outdoor light), generates a voltage or current to be applied to the electronic device, and assesses the voltage level or the current level so as to determine whether to supply the voltage or the current directly to the electronic device and whether to store the voltage-derived power or the current-derived power in the battery for undergoing charging.

The method and system of the present invention are effective in determining whether an electronic device has to control (for example, maintain, increase, or decrease the brightness of) a power-consuming module (such as, a display screen) thereof according to the voltage level or current level in order to save energy. Accordingly, the present invention provides a method and system for performing power management on an electronic device efficiently by means of a thin-film layer capable of photoelectrical conversion.

BRIEF DESCRIPTION OF THE DRAWINGS

Objectives, features, and advantages of the present invention are hereunder illustrated with specific embodiments in conjunction with the accompanying drawings, in which.

DETAILED DESCRIPTION OF THE PREFERRED EMBODIMENTS

Figure 1:
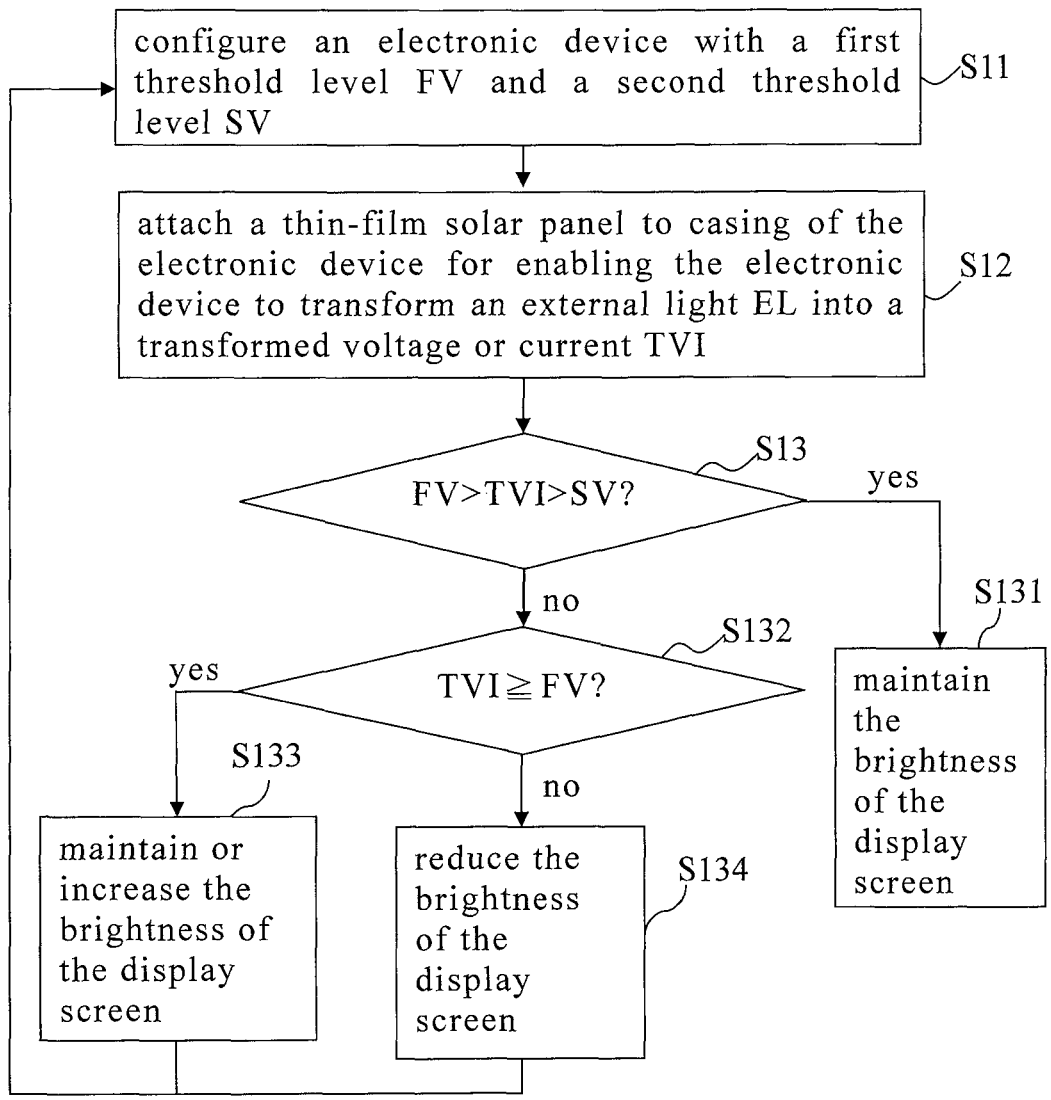
FIG. 1 is a flow chart of a method for adjusting power supply and display screen brightness of an electronic device with a thin-film solar panel according to an embodiment of the present invention.

Referring to FIG. 1, there is shown a flow chart of a method for adjusting power supply and display screen brightness of an electronic device with a thin-film solar panel according to an embodiment of the present invention. As shown in FIG. 1, the method for adjusting power supply and display screen brightness of an electronic device with a thin-film solar panel is applicable to an electronic device having a display screen and a casing. The electronic device is a desktop computer, a tablet computer, a notebook computer, a smartphone, or any electronic apparatus having a display screen.

The process flow of the method for adjusting power supply and display screen brightness of an electronic device with a thin-film solar panel starts with step S11. Step S11 involves configuring the electronic device with a first threshold level FV and a second threshold level SV, with the first threshold level FV being higher than the second threshold level SV, wherein the first threshold level FV and the second threshold level SV are at least one of a voltage level and a current level. In an embodiment, a user or a manufacturer of the electronic device can configure the electronic device with the first threshold level FV and the second threshold level SV by means of software or hardware to suit the environment in which the electronic device operates. The software is an operating system, such as Apple's iPhone iOS, Google's Android, Microsoft's Windows mobile and Win 8. The hardware is a ready-only memory (ROM), an erasable memory, or a basic input/output system (BIOS).

For instance, in an embodiment, the electronic device is a notebook computer configured with the first threshold level FV set to a current of 20 mA and the second threshold level SV set to a current of 10 mA.

Step S12 involves attaching a thin-film solar panel to the casing of the electronic device for enabling the electronic device to convert an external light EL into a transformed voltage or current TVI. The casing serves to enclose or package the display screen. The thin-film solar panel is an organic photovoltaic for absorbing the external light EL (such as sunlight, indoor light, or outdoor light). For example, particles within the organic photovoltaic absorb the energy of the external light EL and thus bring about charge motion, thereby generating a direct current (DC). The thin-film solar panel is attached to a portion of the surface of the casing, wherein the portion of the surface of the casing is of a small area or of a large area. Alternatively, the thin-film solar panel is attached to the display screen of the electronic device, wherein the thin-film solar panel is transparent and thus does not affect the performance of the display screen. Alternatively, the thin-film solar panel is attached to the display screen of the notebook computer.

Step S13 involves determining whether the transformed voltage or current TVI lies between the first threshold level FV and the second threshold level SV to determine whether to supply power to the display screen of the electronic device continuously so as to maintain the brightness of the display screen. An affirmative determination causes step S13 to be followed by step S131. A negative determination causes step S13 to be followed by step S132. The determination process is carried out with a control unit of the electronic device, wherein the control unit is, for example, a self-contained control chip or a central processing unit (CPU).

Step S131 involves maintaining the brightness of the display screen.

For instance, in the situation where the transformed voltage or current TVI manifests in the form of a transformed current of 15 mA, the transformed current of 15 mA lies between the first threshold level FV (such as 20 mA) and the second threshold level SV (such as 10 mA), and thus the brightness of the display screen remains unchanged.

Step S132 involves determining whether the transformed voltage or current TVI is higher than or equal to the first threshold level FV. Go to Step S133 when the determination is affirmative. Go to Step S134 when the determination is negative.

Step S133 involves maintaining or increasing the brightness of the display screen.

For instance, in the situation where the transformed voltage or current TVI manifests in the form of a transformed current of 30 mA, the transformed current of 30 mA is higher than the first threshold level FV (such as 20 mA), and thus the brightness of the display screen is maintained or increased.

Step S134 involves reducing the brightness of the display screen to reduce power consumption.

For instance, in the situation where the transformed voltage or current TVI manifests in the form of a transformed current of 5 mA, the transformed current of 5 mA is lower than the second threshold level SV (such as 10 mA), and thus the brightness of the display screen is reduced.

Upon completion of step S133 or step S134, the process flow of the method according to an embodiment of the present invention goes back to step S11, so as to enable ongoing adjustment of the brightness of the display screen of the electronic device in accordance with the transformed voltage or current TVI.

Figure 2:
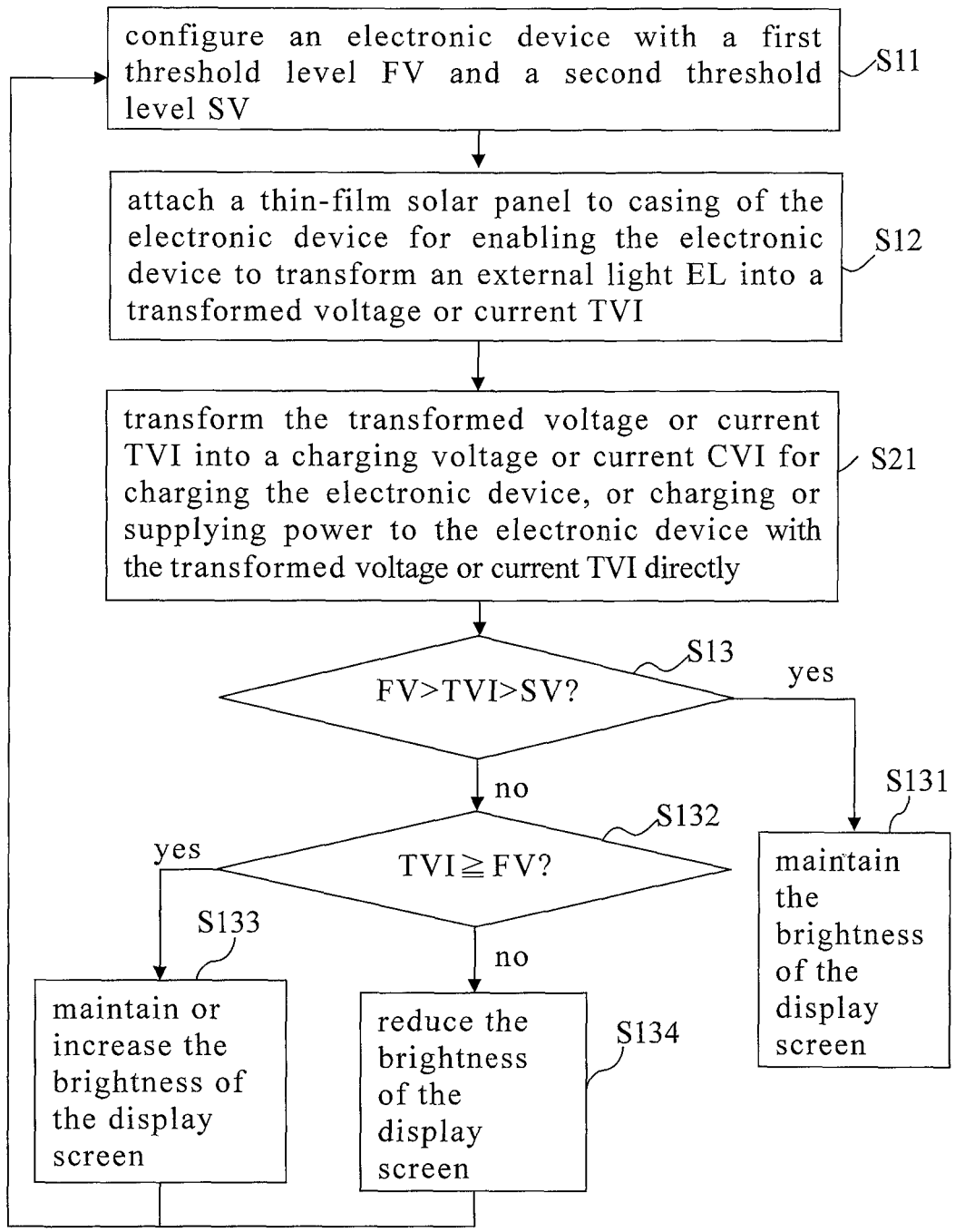
FIG. 2 is a flow chart of the method for adjusting power supply and display screen brightness of an electronic device with a thin-film solar panel according to another embodiment of the present invention.

Referring to FIG. 2, there is shown a flow chart of the method for adjusting power supply and display screen brightness of an electronic device with a thin-film solar panel according to another embodiment of the present invention. The method for adjusting power supply and display screen brightness of an electronic device with a thin-film solar panel is applicable to an electronic device having a display screen and a casing. In addition to the aforesaid steps S11~S14, the method further comprises step S21. Step S21 involves transforming the transformed voltage or current TVI into a charging voltage or current CVI for charging the electronic device, or charging or supplying power to the electronic device with the transformed voltage or current TVI directly.

Figure 3:
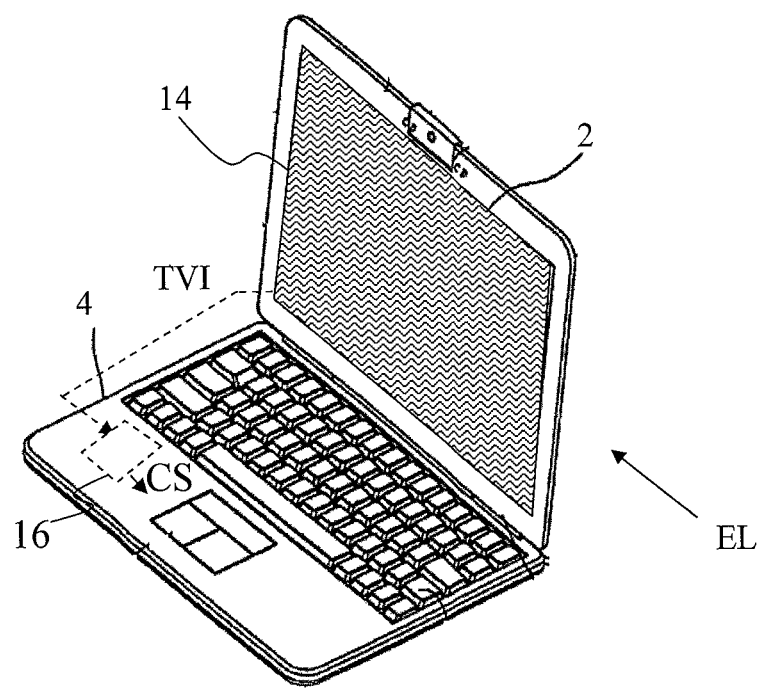
FIG. 3 is a structural schematic view of a system for adjusting power supply and display screen brightness of an electronic device with a thin-film solar panel according to an embodiment of the present invention.

Referring to FIG. 3, there is shown a structural schematic view of a system 10 for adjusting power supply and display screen brightness of an electronic device with a thin-film solar panel according to an embodiment of the present invention. As shown in FIG. 3, the system 10 is applicable to an electronic device 4 with a display screen 2.

The system 10 comprises a casing 12, a thin-film layer 14, and a control unit 16. The display screen 2 is disposed at the casing 12. The thin-film layer 14 is disposed at at least one portion of the casing 12 and adapted to receive an external light EL for performing photoelectrical conversion to generate the transformed voltage or current TVI. For example, the thin-film layer 14 comes in the form of an organic photovoltaic. In an embodiment, the thin-film layer 14 is disposed at an outer margin or an inner margin of the casing 12.

The control unit 16 is configured with the first threshold level FV and the second threshold level SV, connected to the thin-film layer 14, and adapted to control the display brightness of the display screen 2 in accordance with the result of comparison of the transformed voltage or current TVI with the first threshold level FV and the second threshold level SV. In this regard, it is defined that the first threshold level FV is higher than the second threshold level SV, and it is defined that the first threshold level FV and the second threshold level SV are at least one of a voltage and a current. In an embodiment, the control unit 16 comes in the form of a plurality of comparators or a microprocessor.

Figure 4A:
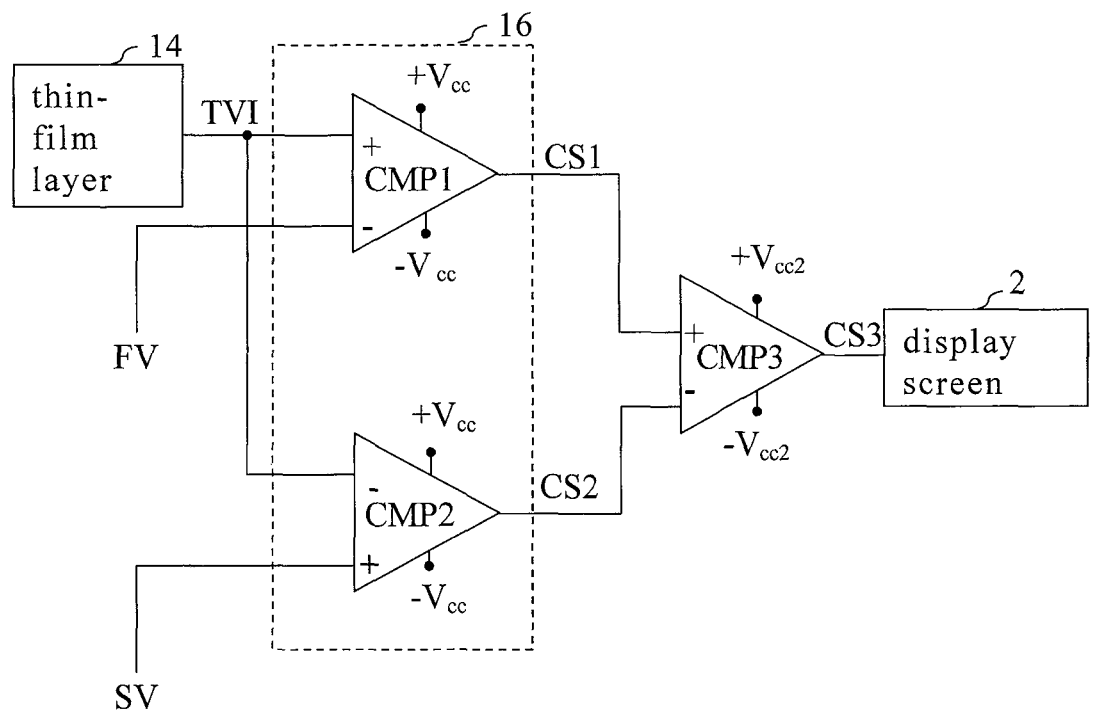
FIG. 4(a) is a structural schematic view of a control unit in FIG. 3.

For instance, referring to FIG. 4(a), in the situation where the control unit 16 is implemented in the form of comparators, in this embodiment, three comparators CMP1, CMP2, CMP3 compare the transformed voltage or current TVI with the first threshold level FV and the second threshold level SV to generate three control signals CS1, CS2, CS3, respectively, for controlling the display brightness of the display screen 2.

For instance, if the positive end of the comparator CMP1 receives the transformed voltage or current TVI and the negative end of the comparator CMP1 is configured with the first threshold level FV or the second threshold level SV, the comparator CMP1 will output positive saturated voltage $+V_{cc}$ for functioning as the control signal CS1 when the comparison result indicates that the transformed voltage or current TVI (for example, in the form of a voltage) is higher than or equal to the first threshold level FV. Conversely, if the comparison result indicates that the transformed voltage or current TVI (for example, in the form of a voltage) is lower than or equal to the first threshold level FV, the comparator CMP1 will output negative saturated voltage $-V_{cc}$ for functioning as the control signal CS1. The above-mentioned applies to the comparators CMP2, CMP3 too.

Figure 4B:
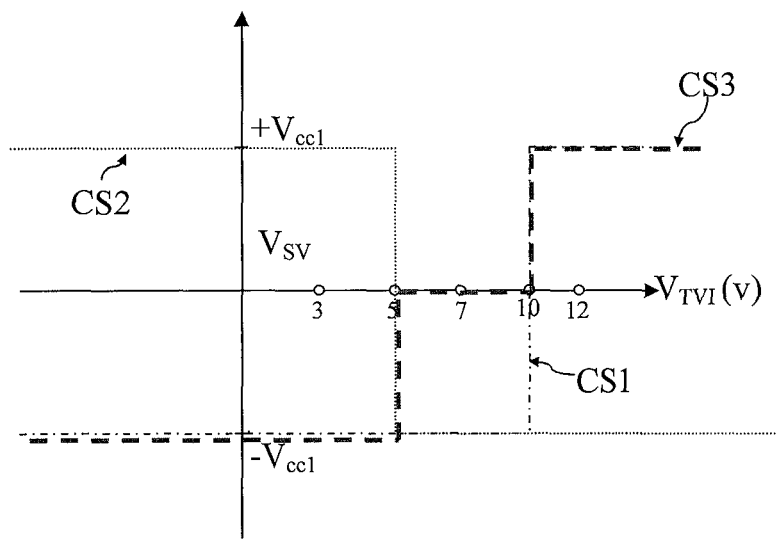
FIG. 4(b) is a transfer characteristic curve of the control unit in FIG. 3.

Referring to FIG. 4(b), there is shown a transfer characteristic curve of the control unit 16 in FIG. 3, where the control unit 16 is configured with the first threshold level FV of 10V and the second threshold level SV of 5V. If the transformed voltage or current TVI (for example, in the form of a voltage) is higher than or equal to 10V, the control signal CS3 will output positive saturated voltage $+V_{cc}$. If the transformed voltage or current TVI (for example, in the form of a voltage) is lower than the first threshold level FV but higher than the second threshold level SV, the control signal CS3 will output a zero voltage. If the transformed voltage or current TVI (for example, in the form of a voltage) is lower than or equal to 5V, the control signal CS3 will output negative saturated voltage $-V_{cc}$. The above-mentioned is illustrative rather than restrictive of the present invention, and thus the present invention is not limited to implementing the control unit 16 in the form of a plurality of comparators.

Depending on the result of comparison, the control signal CS takes care of three scenarios. The control signal CS serves to control the maintenance or enhancement of the brightness of the display screen as soon as the control unit determines that the transformed voltage or current TVI is higher than or equal to the first threshold level FV. The control signal CS serves to control the maintenance of the brightness of the display screen as soon as the control unit determines that the transformed voltage or current TVI lies between the first threshold level FV and the second threshold level SV. The control signal CS serves to control the reduction of the brightness of the display screen as soon as the control unit determines that the transformed voltage or current TVI is lower than or equal to the second threshold level SV.

Figure 5:
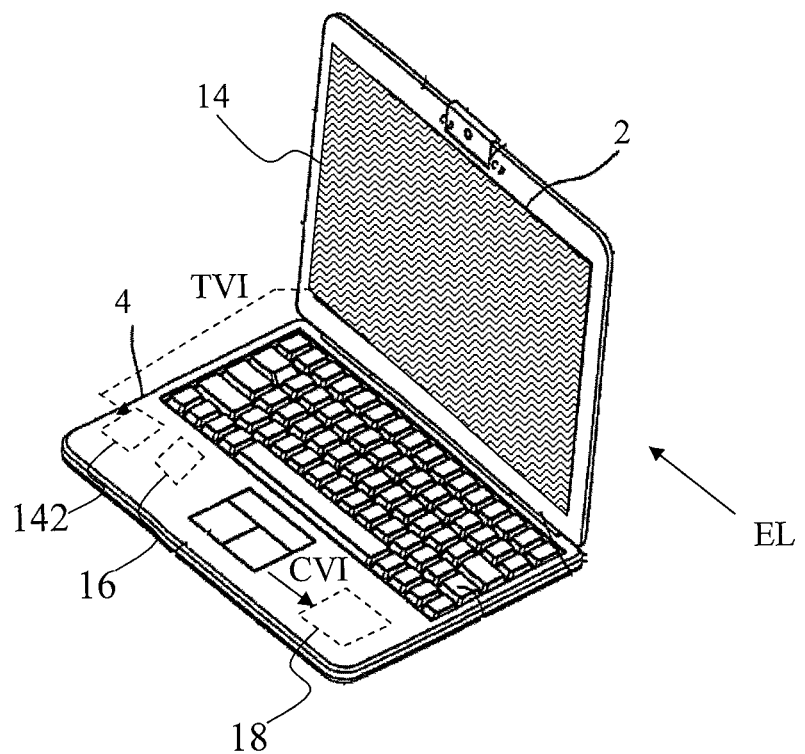
FIG. 5 is a structural schematic view of the system for adjusting power supply and display screen brightness of an electronic device with a thin-film solar panel according to another embodiment of the present invention.

Referring to FIG. 5, there is shown a structural schematic view of the system 10 for adjusting power supply and display screen brightness of an electronic device with a thin-film solar panel according to another embodiment of the present invention. In the another embodiment shown in FIG. 5, the system 10 is applicable to the electronic device 4 with the display screen 2. In the another embodiment shown in FIG. 5, in addition to the casing 12, the thin-film layer 14, and the control unit 16, the system 10 further comprises a battery unit 18. The battery unit 18 is connected to the thin-film layer 14. The thin-film layer 14 is where the battery unit 18 is charged with the transformed voltage or current TVI.

The thin-film layer 14 further comprises a voltage transforming unit 142 for transforming the transformed voltage or current TVI into a charging voltage or current CVI and sending the charging voltage or current CVI to the control unit 16 for determining whether to adjust the display brightness of the display screen 2. In an embodiment, the battery unit 18 is connected to the thin-film layer 14 and charged with the charging voltage or current CVI generated from the thin-film layer 14.

The present invention provides a method and system for adjusting power supply and display screen brightness of an electronic device with a thin-film solar panel. The method and system of the present invention are effective in supplying power, charging, and detection by means of a single thin-film solar panel (also defined as a solar energy thin-film layer according to the present invention) disposed at a casing of the electronic device, and thus power management can be efficiently performed on the electronic device. The solar energy thin-film layer receives an external light, generates a voltage or current to be applied to the electronic device, and assesses the voltage level or the current level so as to determine whether to supply the voltage or the current directly to the electronic device and whether to store the voltage-derived power or the current-derived power in the battery for undergoing charging. The method and system of the present invention are effective in adjusting the display brightness of the display screen of the electronic device according to the power level.

Accordingly, the present invention provides a method and system for performing power management on an electronic device efficiently by means of a thin-film layer capable of photoelectrical conversion.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. A method for adjusting power supply and display screen brightness of an electronic device with a thin-film solar panel, the method being applicable to an electronic device having a display screen and a casing, the method comprising the steps of:
    configuring the electronic device with a first threshold level and a second threshold level, the first threshold level being higher than the second threshold level, wherein the first threshold level and the second threshold level are at least one of a voltage level and a current level;
    attaching the thin-film solar panel to the casing for enabling the electronic device to convert an external light into a transformed voltage or current; and
    determining whether the transformed voltage or current lies between the first threshold level and the second threshold level to determine whether to supply the transformed voltage or current to the electronic device continuously so as to maintain a brightness of the display screen;
    wherein at least one of the step of supplying the transformed voltage or current to the electronic device directly and the step of transforming the transformed voltage or current into a charging voltage or current for charging a battery unit of the electronic device, is performed.

2. The method of claim 1, further comprising the step of maintaining or increasing the brightness of the display screen when the transformed voltage or current is higher than or equal to the first threshold level.

3. The method of claim 1, further comprising the step of reducing the brightness of the display screen when the transformed voltage or current is lower than or equal to the second threshold level.

4. A system for adjusting power supply and display screen brightness of an electronic device with a thin-film solar panel, the system being applicable to an electronic device having a display screen, the system comprising:
    a casing for holding the display screen;
    a thin-film layer disposed at at least a portion of the casing and adapted to receive an external light for performing photoelectrical conversion to generate the transformed voltage or current; and
    a control unit configured with a first threshold level and a second threshold level, connected to the thin-film layer, and adapted to control a brightness of the display screen in accordance with a result of comparison of the transformed voltage or current with the first threshold level and the second threshold level, wherein the first threshold level and the second threshold level is in form of at least one of a voltage and a current;
    wherein the battery unit is connected to the thin-film layer, and the thin-film layer further comprises a voltage transforming unit for transforming the transformed voltage or current into a charging voltage or current and charging the battery unit with the charging voltage or current.

5. The system of claim 4, wherein the first threshold level is higher than the second threshold level.

6. The system of claim 5, wherein the control unit maintains or enhances the brightness of the display screen upon determination that the transformed voltage or current is higher than or equal to the first threshold level.

7. The system of claim 5, wherein the control unit maintains the brightness of the display screen upon determination that the transformed voltage or current lies between the first threshold level and the second threshold level.

8. The system of claim 5, wherein the control unit reduces the brightness of the display screen upon determination that the transformed voltage or current is lower than or equal to the second threshold level.

9. The system of claim 4, wherein the thin-film layer is in the form of an organic photovoltaic.

10. The system of claim 4, wherein the thin-film layer is disposed at an outer margin or an inner margin of the casing.

11. The system of claim 4, wherein the control unit is in the form of a plurality of comparators.

* * * * *